April 2, 1940.  W. L. SHIVELY ET AL  2,195,431
GAS TREATING APPARATUS
Filed Oct. 9, 1935  9 Sheets-Sheet 1

INVENTORS.
WALTER L. SHIVELY,
EARL V. HARLOW.
BY Henry Love Clarke
ATTORNEY.

April 2, 1940.　　　W. L. SHIVELY ET AL　　　2,195,431
GAS TREATING APPARATUS
Filed Oct. 9, 1935　　　9 Sheets-Sheet 2
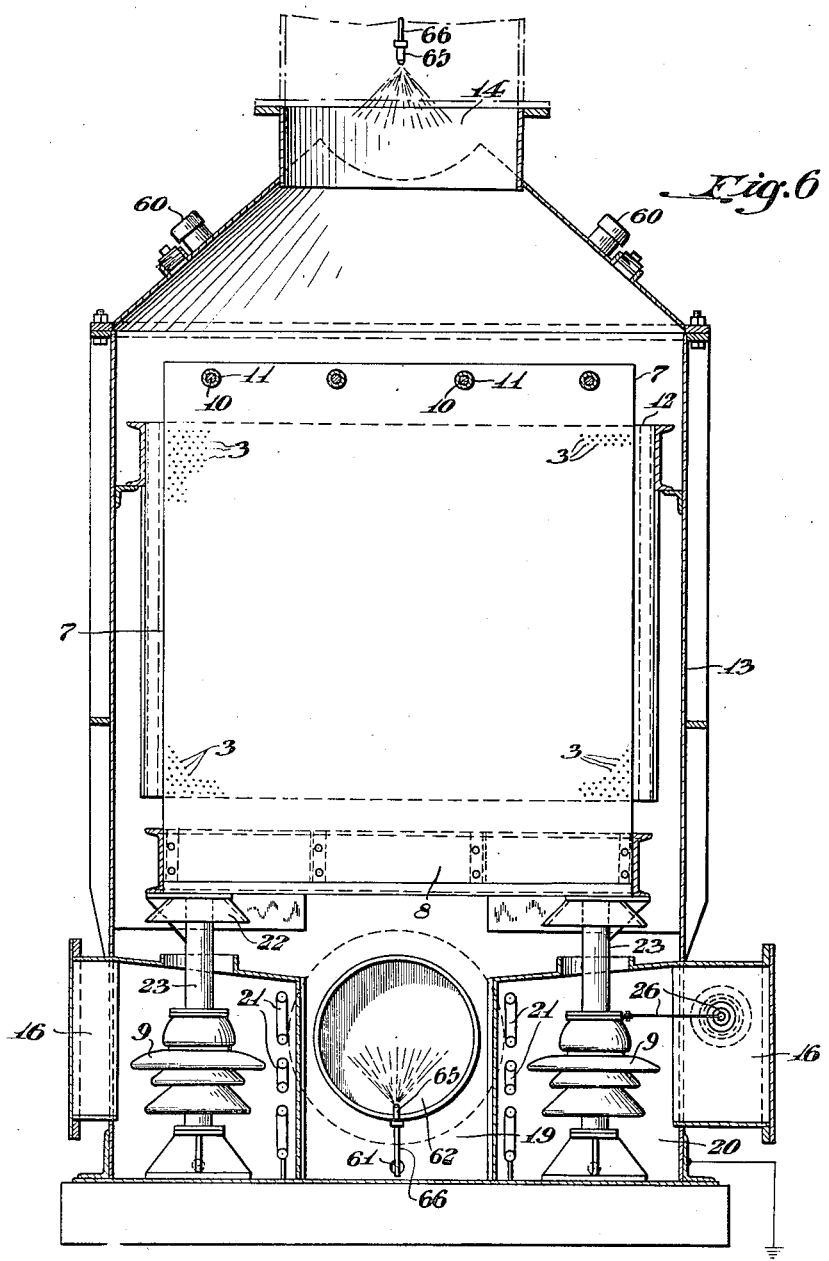
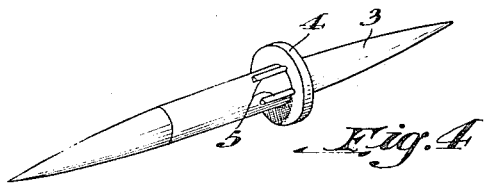
INVENTORS.
WALTER L. SHIVELY,
EARL V. HARLOW.
BY
ATTORNEY

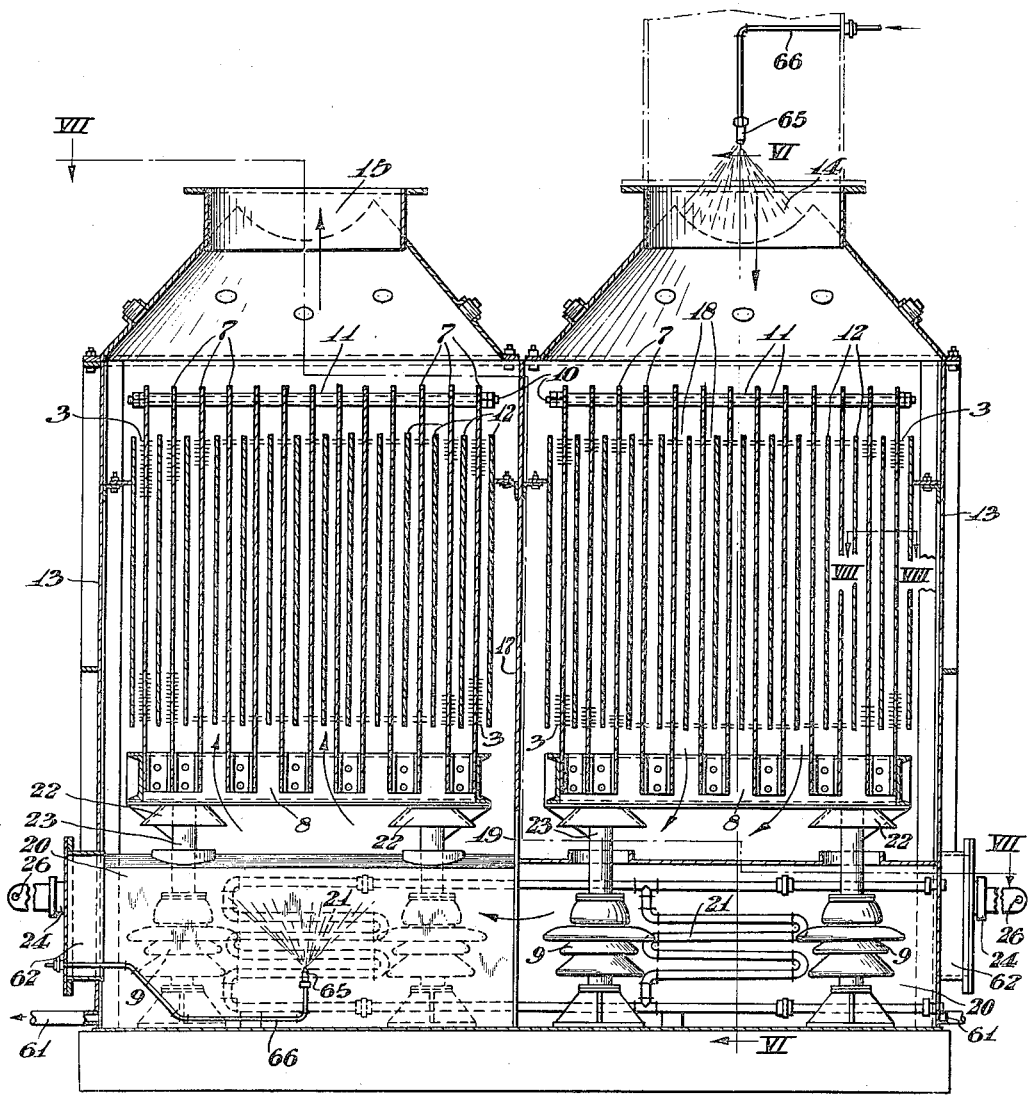

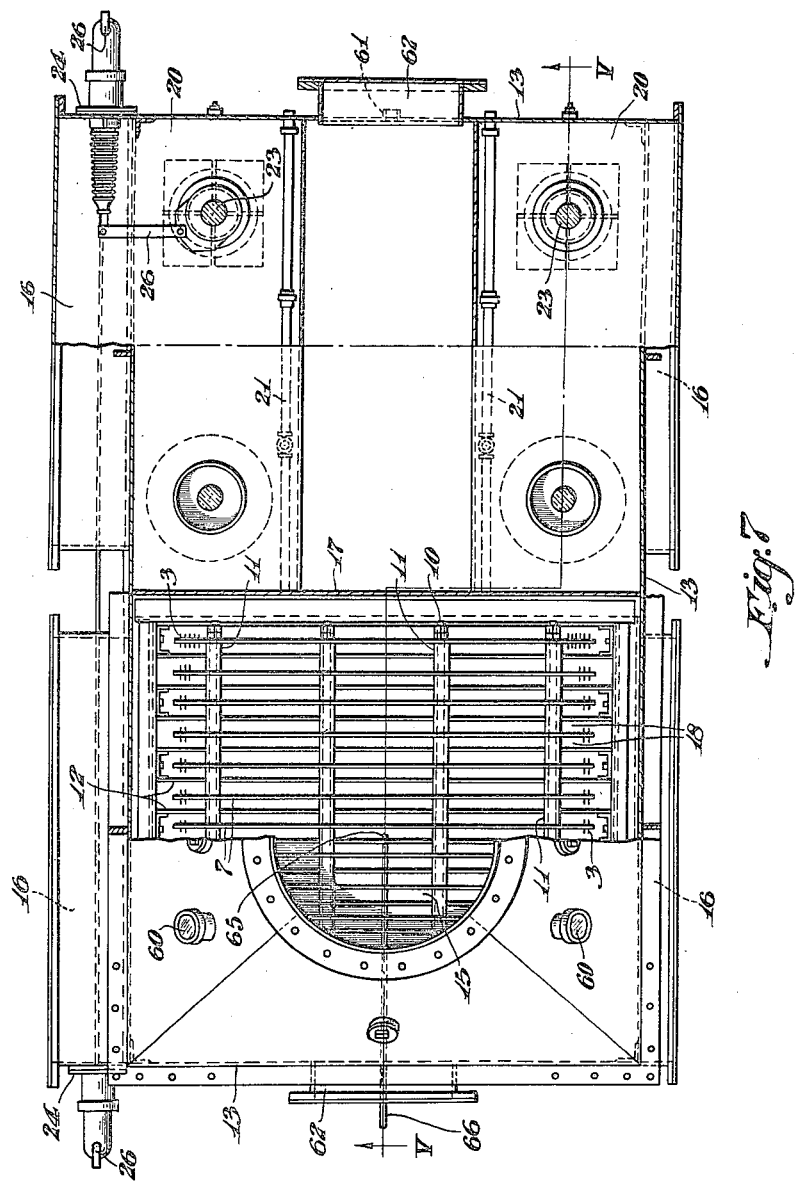

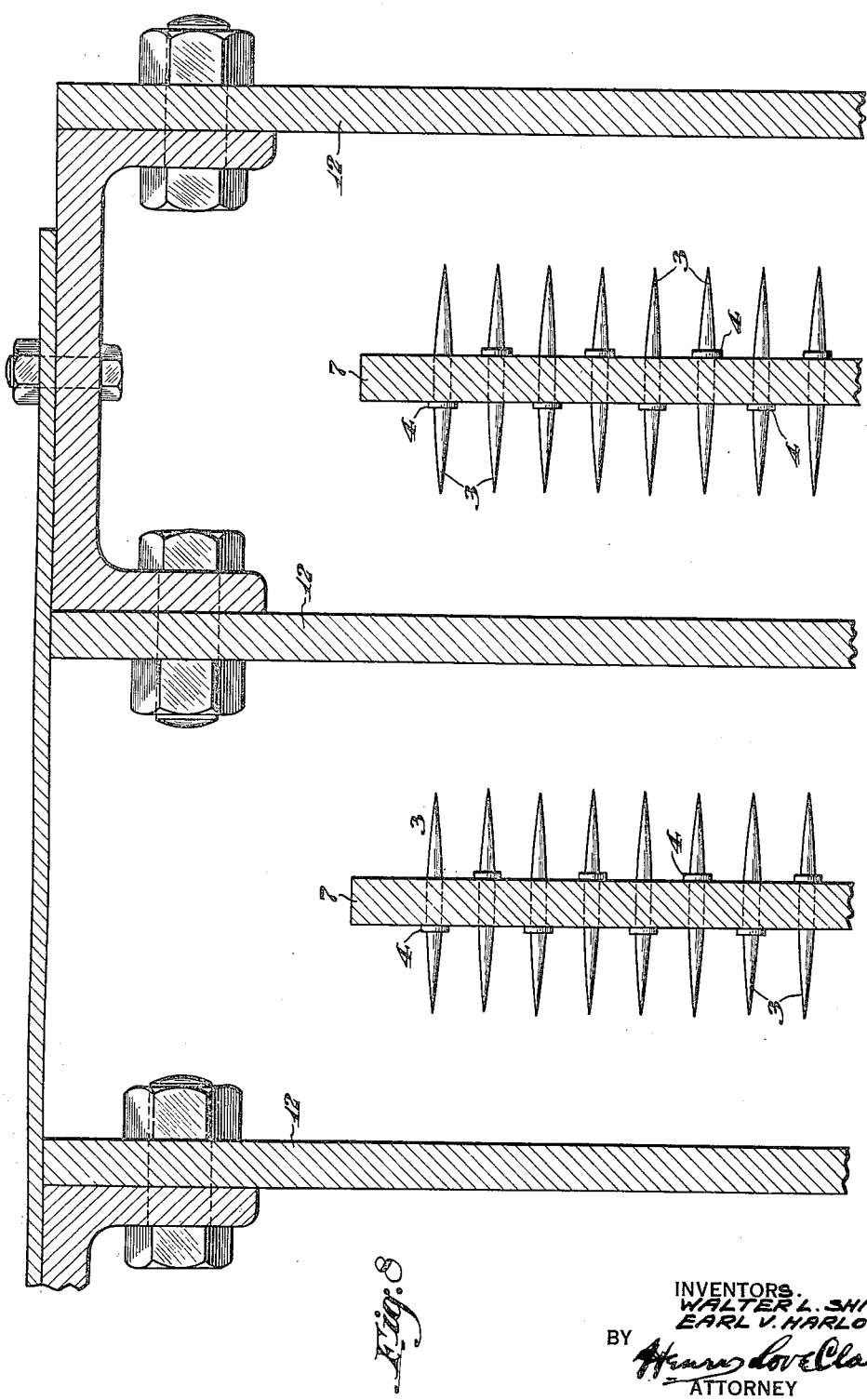

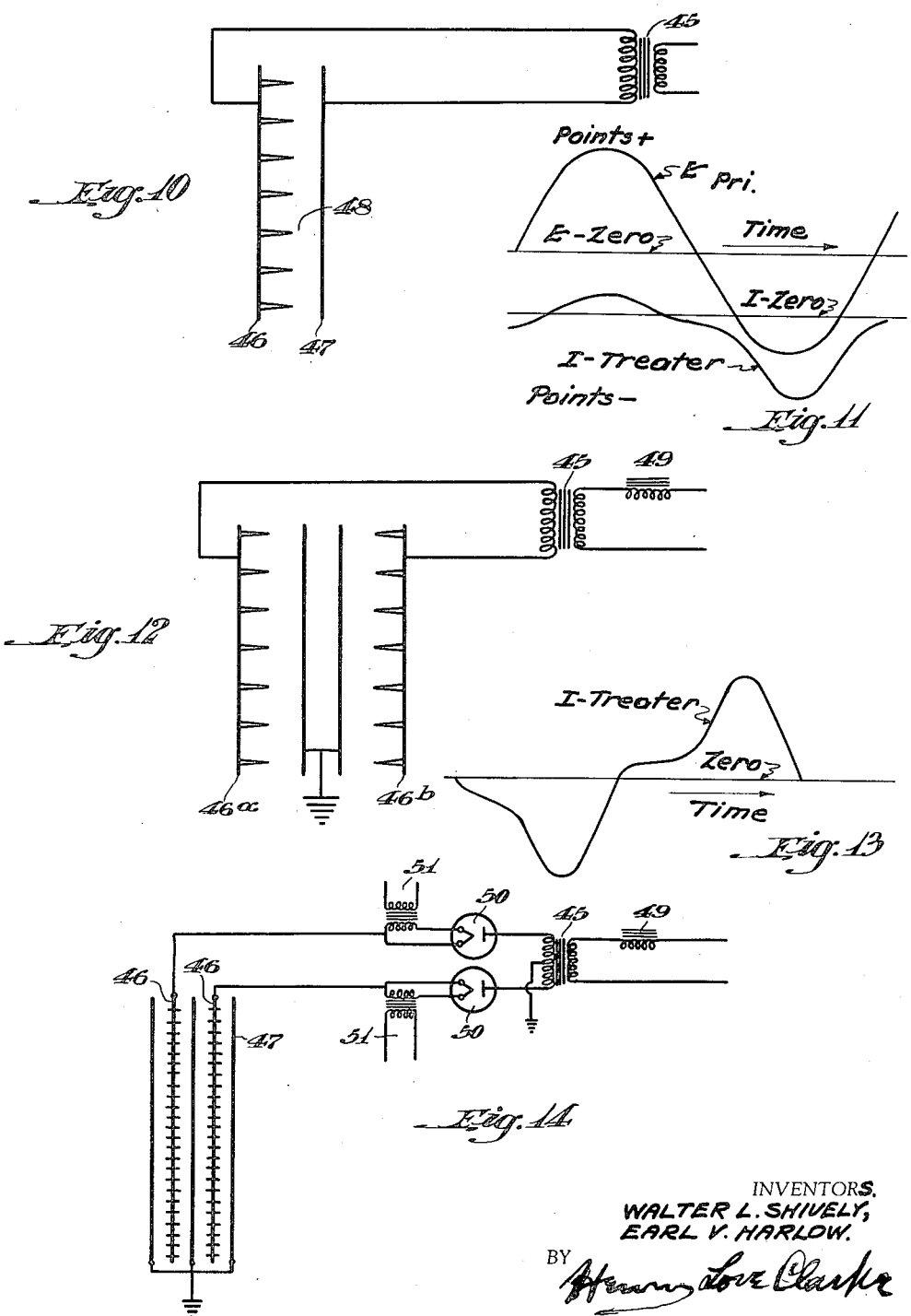

April 2, 1940. W. L. SHIVELY ET AL 2,195,431
GAS TREATING APPARATUS
Filed Oct. 9, 1935 9 Sheets-Sheet 8
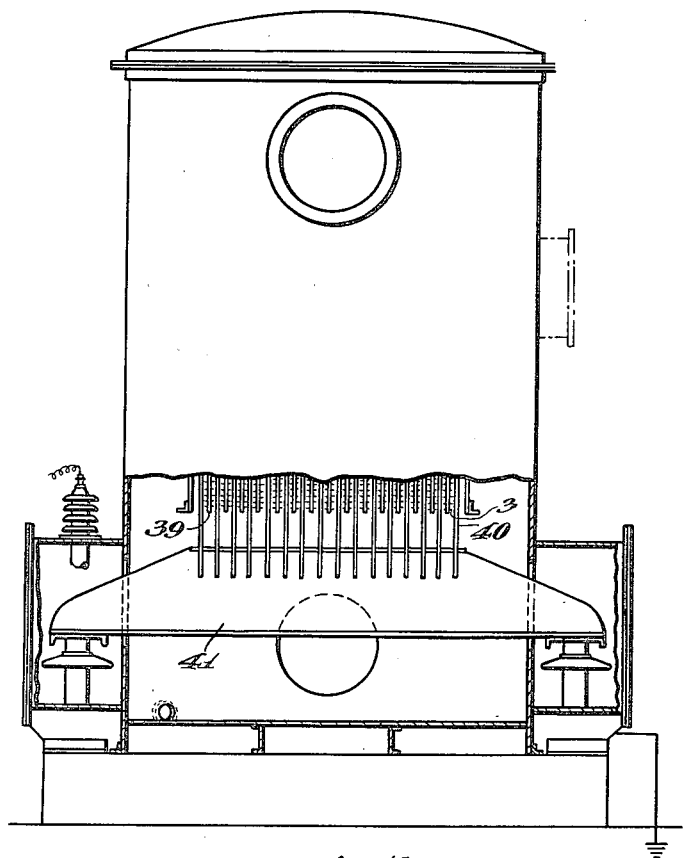
Fig. 15
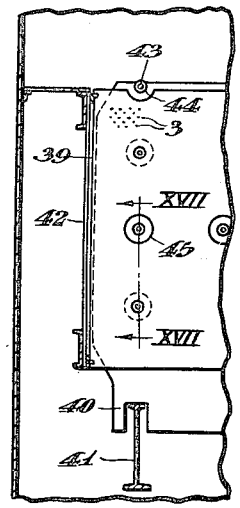
Fig. 16
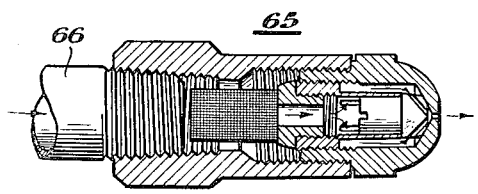
Fig. 19
Fig. 17
INVENTORS.
WALTER L. SHIVELY,
EARL V. HARLOW.
BY
ATTORNEY.

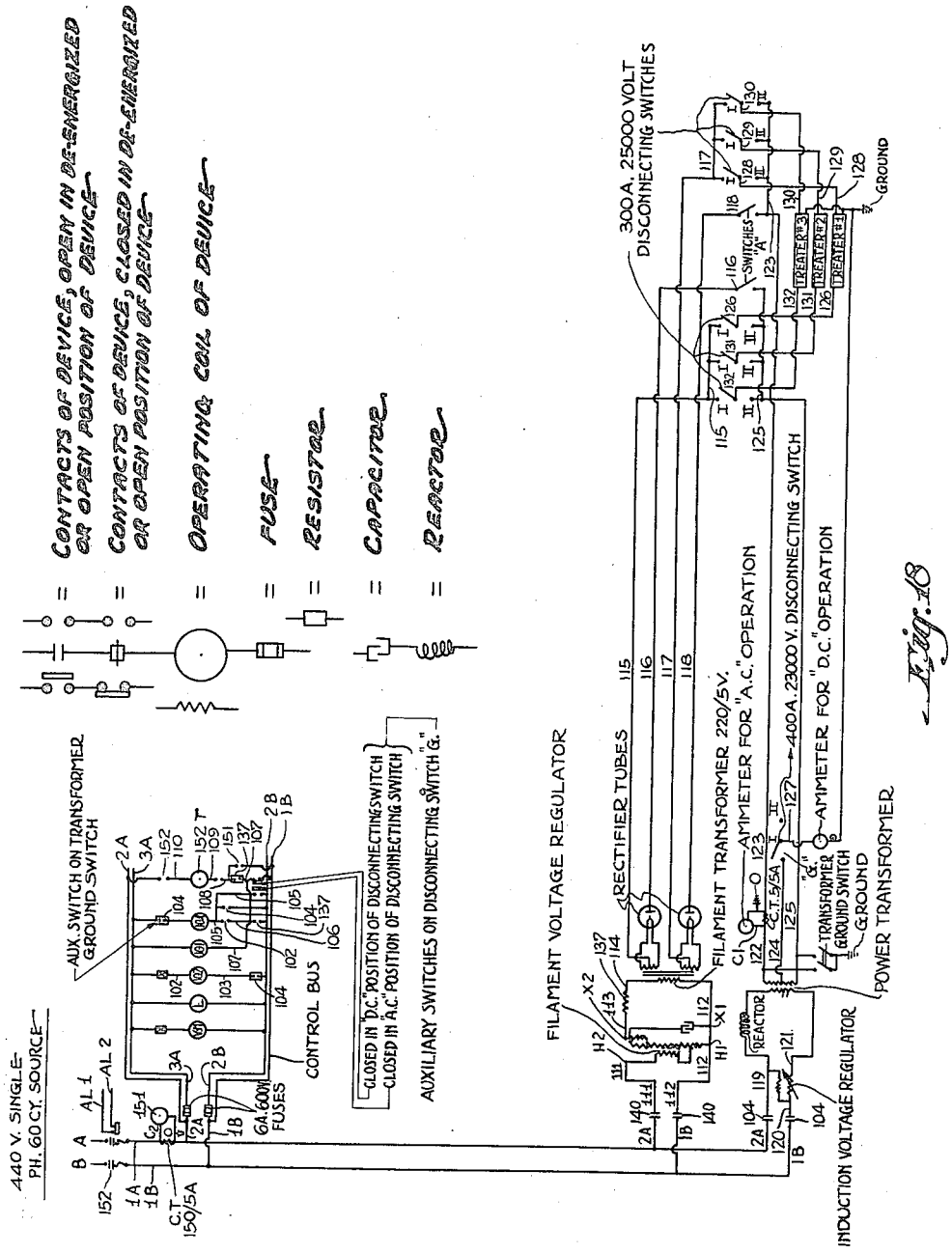

Patented Apr. 2, 1940

2,195,431

UNITED STATES PATENT OFFICE 2,195,431

GAS TREATING APPARATUS

Walter L. Shively, Hamden, Conn., and Earl V. Harlow, Philadelphia, Pa., assignors, by mesne assignments, to Koppers Company, a corporation of Delaware Application October 9, 1935, Serial No. 44,258

20 Claims. (Cl. 204—31)

The present invention is primarily directed to improvement in means for treating fuel gases, such as coke oven gas, after it has been purified of tar, ammonia, $H_2S$, HCN, etc., to destroy the tendency toward gum formation in such gas during its distribution in distribution systems therefor, and the invention relates in general to a device and embodying apparatus for subjecting fluids and more especially manufactured fuel gases to a high potential electrical discharge comprised primarily of that type of gap transfer known as the "brush" or "point" discharge, whereby gases of the aforementioned nature may be stabilized so that their tendency to progressively form gum-like suspensoids is substantially eliminated, the gases having been processed for municipal distribution systems even to the extent of naphthalene removal as well as hydrogen sulphide removal, but whether or not after such removal.

Certain constituents of manufactured fuel gases are known to exhibit changes in their chemical constitution in the distribution systems for such fuel gases for considerable time after completion of the manufacturing period. These alterations in chemical structure are in certain instances attended by changes in physical form so radical as to form new substances no longer classed with the permanent gases, and which assume the form of finely dispersed suspensoids that are carried in that form for indefinite periods in distribution lines. Their formation is a progressive reaction of which little indication may be shown at the manufacturing station, but which may be definitely demonstrated to be present in the distribution lines at distances remote from that point. In total quantity, they are relatively small but sufficient to effect depositions in the fine orifices controlling the flow of gas of pilot lights and the like, to extinguish them and thereby give rise to obvious inconvenience and hazard.

It is generally agreed that the "unsaturateds" of such gases, certain members of which class are highly reactive, are responsible for this phenomenon since they are extremely sensitive to environmental change. The change in composition of an associated constituent of the gas may even induce their chemical and physical alteration.

Within manufactured fuel gases, for example, are found traces of constituents such as the oxides of nitrogen and more especially nitric oxide, which is a relatively unreactive substance in many admixtures but which in the presence of small amounts, for example, of oxygen and catalytic bodies usually present in artificial fuel gases, may slowly but progressively change to form new oxygen combinations which are exceedingly reactive and will combine with many of the associated constituents of the gas, more especially the organic gum-forming "unsaturateds," to progressively form gum-like suspensoids and compounds that give rise to the aforementioned inconveniences and hazards. It has been demonstrated that amounts of nitric oxide in manufactured gases as low as one tenth part per million or even lower will produce such results.

It is a well-known fact that an electrical discharge of the "brush" or "point" discharge type is of potent assistance in promoting and accelerating divers reactions of a chemical nature and will direct and hasten toward completion interactions of a wide range of chemical entities, which normally react sluggishly or because of great dispersion throughout a relatively inert medium may only approach the completion of their end reactions over a protracted period. Excitation of substances of this nature by a "brush" discharge apparently stimulates them to a chemical reactivity exceeding their normal tendency and quickly accelerates their combination into products of a less easily alterable form. The effect of the electrical discharge may even induce reactions and combinations of the less stable gaseous components such as under other conditions would not result. In our invention, therefore, we have provided improved means to adapt and employ the chemical accelerating effect of the "brush" discharge to effect in a short time interval a stabilization of fluid fuels containing oxides of nitrogen, like nitric oxide in manufactured fuel gases, against their tendency to form gums, a reaction which normally takes place at a much slower rate during their distribution in systems therefor.

The mechanism of the actual physics or chemistry of this effect is beyond the scope of this specification to clarify. It has been found, however, as has also been disclosed in the co-pending application of one of us, Walter L. Shively, Serial No. 557,994, filed August 19, 1931, that manufactured fuel gases when subjected to a "brush" discharge have substantially lost their tendency to sluggishly form gummy suspensoids which accumulate and give rise to distribution disturbances; and that consequently, highly desirable improvements in their characteristics have been effected.

The chemical changes in substance structure which we desire to effect by means of the "brush" or "point" discharge and the hereinafter described apparatus for producing it, consume significant quantities of energy which are apparently required to bring about the desired constitutional alterations. To produce our preferred results, it is therefore, insufficient to pass the gases through an electrically energized field in which there is a high tension discharge and but little current transfer or in which currents small relative to the current carrying capacity of the gas are flowing. Actual bombardment of the processing substances by an electronic or ionic stream of significant proportions is necessary. This will be more readily appreciated when it is realized that chemical reactions involve generally an exchange of energy and oftentimes require an energy input to initiate them. It will, therefore, be appreciated by those experienced in the art, that we are effecting elementary changes in the constitution of materials by our process, since in a "brush" or "point" discharge a very appreciable transfer of energy through the electrical field takes place and in respect of this, the conditions within the electrical field, the results obtained and means for effecting them, are not akin to those used and produced in electrical devices to remove from suspension finely dispersed materials of the nature of fogs, mist, dust and the like. In the case of the latter, maintaining the electrical field under a high potential gradient with little energy transfer is sufficient to produce the desired effects, while in our invention a larger and uniformly distributed energy flow across the field is of particular importance. In other words, in electrical precipitation a small amount of ionization, a part of which may be inherent to the suspensoid by nature, is taken advantage of to attract the ion bearing suspensoids to poles maintained at different polarities and if the electrical potential difference is sufficient, the suspensoid will follow the attached ions in their transits toward the same. In our invention, we liberate great numbers of ions and electrons which due to the high potential gradient, are energized to flow through the electric field, bombard the gaseous molecules passing simultaneously therethrough in such manner as to disrupt them and produce new fragments which are exceedingly reactive and which, while they produce no substantial precipitation in the treater to collect on the electrodes, may be made to precipitate from the gas current immediately after the treater or to react or combine to produce new entities of altered chemical and physical characteristics.

The designations "brush" or "point" discharge applied to the electrical phenomenon with which we are immediately concerned are also quite descriptive of its appearance and method of production. It is preferably produced in preferred amount and distribution from a sharp point held at moderately high potential and not from a filament. It is accompanied by a characteristic and peculiar "swishing" sound. The negative brush discharge is short, visible for about ¼ inch from the point and is bluish white, while the positive brush extends across the discharge space and has a purplish hue, with a tentacular, brush or treelike appearance. The brush discharge is also attended by a significant energy transfer across the circuit gap with development of but very little heat and light. It differs from the "non-luminous" and "glow" or "silent" discharges in that in the latter there is very little electrical leak across the gap; and differs also from the electrical flame and power arc in that these develop light and heat and the electrical potential differences across the gap are lower. The spark and sustained arc represent a much more concentrated transfer of electrical energy than the "brush" discharge and are accompnied by a cracking sound with development of heat which is disruptive to the material from which it is produced, while the "brush" discharge is more voluminous in distribution, and as little heat is developed, effects the material source but slightly.

We realize that some over-lapping of the various types of high potential discharge exists, but to produce our preferred results, the discharge we employ must be predominantly of the "brush" or "point" type.

An object of our invention is, therefore, to produce a commercially economic device of such design as will produce an abundant high potential discharge of the "brush" or "point" discharge type for the purpose, from the electric power usually available in gas plants, and which will be reliable in operation and sufficiently cheap in manufacture to make it available for use in technical plants where it is desired to subject large quantities of gas to the stabilizing effects of such discharge.

Another object of our invention is to provide electrical circuit systems which may be used to modify the characteristics of the electrical power supply usually found in industrial plants so that they may meet requirements of our invention and the different current flow effects it is desired to produce within the treated gas.

A further object is to provide various practical exemplifications and embodiments of our invention which adapt it to technical needs and permit an economical and effective exploitation thereof, which will give assured continuity of performance. The invention has for further objects such other improvements and such other operative advantages or results as may be found to obtain in the processes or apparatus hereinafter described or claimed.

Briefly stated our invention comprises providing in a gas treating chamber, units having a plurality of properly supported sharp discharge points on one or both sides of the gap in an electrical circuit system, so disposed and oriented to each other as not to mutually repress or obstruct their discharging electrically across said gap during gas flow through the gap, all points on one side of the gap lying substantially in the same plane or equidistant from the points or surfaces on the opposite side of the discharge space, and means for retaining the points in the stated relationship.

It comprises, also, providing a discharging space of sufficient volume to treat such quantities of gas as are commerciably feasible and of such dimensicns that the characteristics of the usual electrical energy supply available can be used and economically modified to meet the conditions of the provided treating space.

It further comprises providing embodying and structural supporting means that are adapted to the special purpose.

In the accompanying drawings forming a part of this specification and showing for purposes of exemplification preferred apparatus and methods in which the invention may be embodied and practised but without limiting the claimed invention specifically to such illustrative instance or instances:

The same characters of reference designate the same parts in each of the views of the drawings.

Figure 4 is an enlarged view in detail of one of the pins which are fitted into the perforated plate in Figure 3 to form the electrode discharge points and shows a means of effecting a rigid connection between pin and plate.

Figure 5 is a side elevational view in section of an embodiment of our invention, taken on the line V—V of Figure 7.

Figure 6 is an elevational view in section lengthwise of the electrodes, of the embodiment shown in Figure 5, exhibiting details of construction and taken on line VI—VI of Figure 5.

Figure 7 is a top plan view partly in section of the structure, taken on the line VII—VII of Figure 5.

Figure 8 is a full size horizontal cross-sectional view along the line VIII—VIII of Figure 5 showing the vertical edges of the electrodes and their arrangement between the grounded plates fixed to the apparatus shell.

Figures 10, 11, 12, 13 and 14 are diagrammatic representations of various electrical circuits which may be used in the practice of our invention, and of which Figure 12 shows one preferred circuit.

Figures 15, 16 and 17 show the assembly and details of still another feasible construction embodying the principle of our invention, but in this exemplification thereof the pointed electrodes are grounded and the smooth plates comprise the insulated members of the discharge gap. Figure 17 is a vertical section along the line XVII—XVII of Figure 16.

Figure 18 is a schematic wiring diagram for energizing the electrodes in our apparatus.

Figure 19 shows a spray nozzle we have found adaptable for distributing flushing fluid to the electrodes of our apparatus.

Having so described the general nature and object of our invention, viz., provision of an apparatus for developing an electrical discharge predominantly of the "brush" type, which will be adaptable and feasible as aforesaid for treating commercial quantities of fluids in an economical and efficient manner, by reference to the aforementioned drawings we will explain in detail methods of construction, operation, and certain exemplifying embodiments of our invention, and cite instances of its effective application.

As previously mentioned, a sharp point maintained at a high electrical potential will discharge an electrical current therefrom in a relatively quiet and steady manner either into the surrounding atmosphere or across a gap to an adjacent electrode within the electrical circuit. If the radius of curvature of the discharging electrode or point is only a small fraction of the distance between the electrodes, for example not more than about $\frac{1}{32}$ inch in the case of one inch gap, the smooth electrical discharge will assume the form of the so-called "brush" discharge.

Since an object of our invention is to provide an apparatus capable of producing such a discharge over a relatively large area whereby significant quantities of material, like the gas output of a coke plant, may be brought under the influence of the discharge within a reasonable length of time and gas pressure, we provide in a preferred embodiment of our invention, within each gas passage, numerous such discharging points all of which lie substantially in the same plane and are consequently equidistant from their supporting structure. Various methods and means of fabricating such a device are conceivable, and we do not intend to limit our invention in all its aspects to the following embodiments thereof, given as specific examples for the purpose of more clearly understanding our intent.

Figure 3:
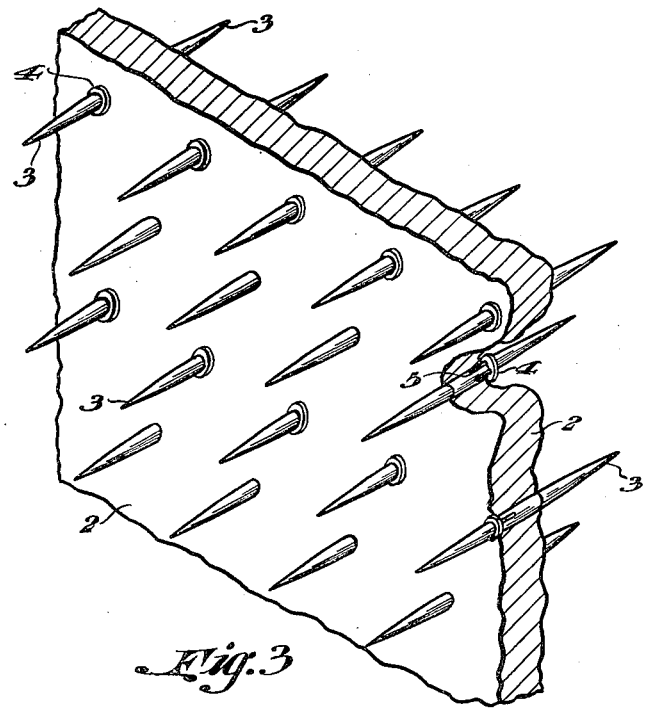
Figures 1, 2, 3 show electrodes equipped with discharging points disposed equidistant from a flat electrode surface and from each other and illustrate two of the various methods by which electrodes of our invention may be fabricated, Figure 3 showing a preferred structure.
Figure 1:
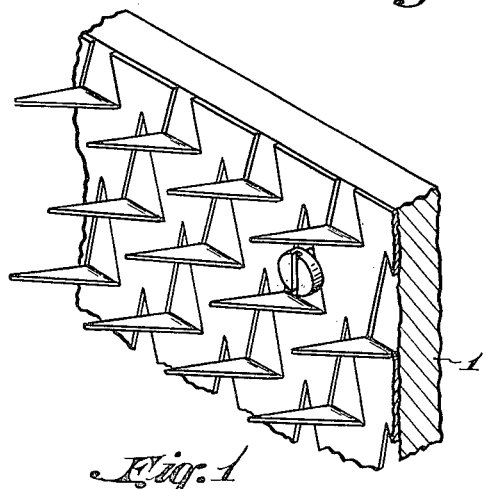

In Figure 1 is shown a "point" electrode conforming to certain of our requirements which comprises a rigid metal plate 1 having surfaces which are substantially planes and of sufficient rigidity to resist distortion or warping. Thereon is made fast by bolts or screws a light metal sheet which has been perforated with uniformly disposed triangular shaped holes. The metal on the corresponding side of all said triangular openings remains uncut, so that the excised portions still remain attached to the metal sheet, and may be consequently punched out to assume a position at right angles to the sheet surface substantially as shown, thereby provided a series of points equidistant from those adjacent and lying within the same plane.

Figure 2:
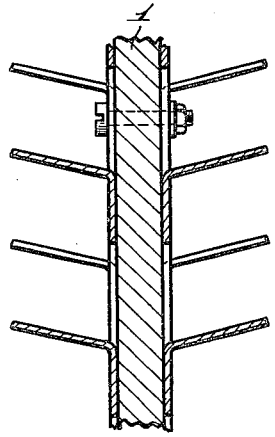
Figure 9:
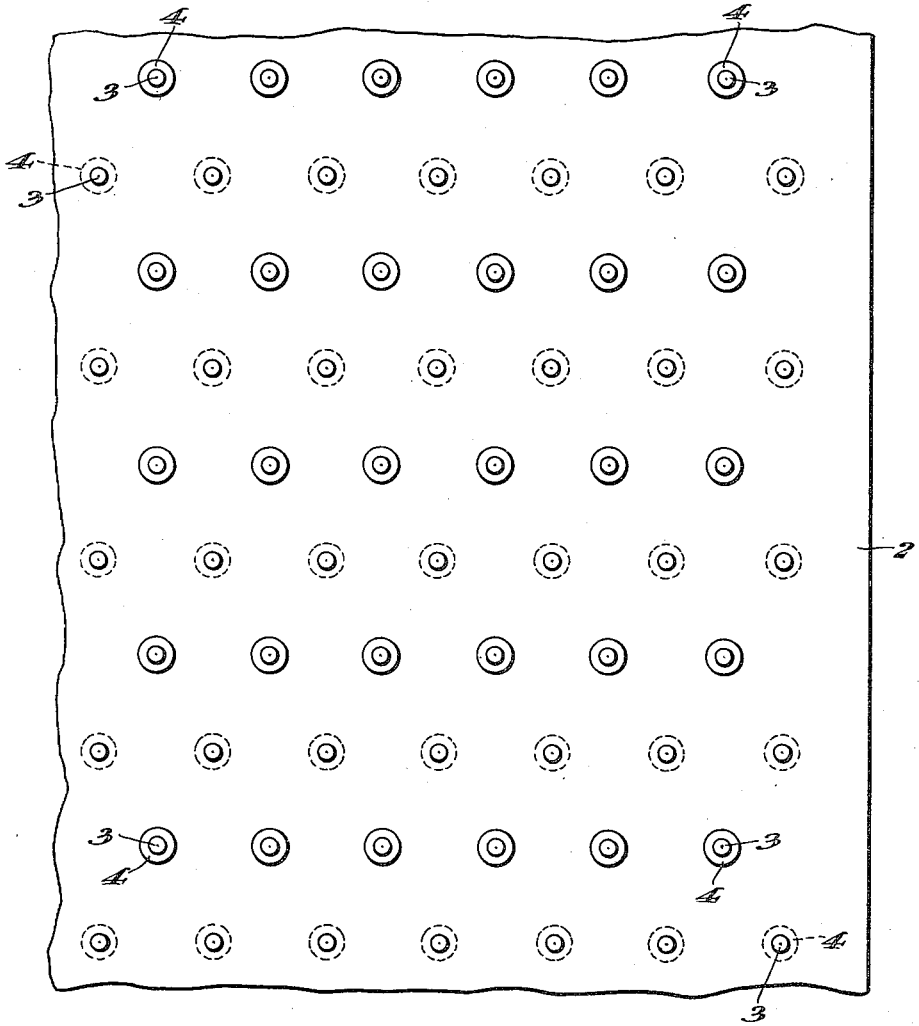
Figure 9 is a full size elevational view of one of the point-studded faces of the electrode partly shown in perspective in Figure 3.

In Figure 2 is shown a modification of the above-described point electrode in which the excised portions assume an angularity other than the normal to the metal sheet, but still parallel to each other, thereby providing drainage for those instances when the electrode is immersed in an environment from which condensates may be precipitated.

Another type of construction, and perhaps preferable because of its stability and otherwise, is shown in Figures 3, 4, 8 and 9. It comprises a rigid metal plate 2 having holes drilled normally therethrough of equally disposed remoteness from those adjacent. Inserted within said holes are sharp double-ended pins 3 of slightly less diameter than the drilled holes and having shoulders 4 thereon (Figure 4). The shoulders are formed at such point along the lengthwise axis of the pin that when inserted in the drilled plate and the shoulder is flush with backing-plate surface, pin points are equidistant from the adjacent drilled surfaces. A plate so studded with pins will form two discharge surfaces.

The pins may be rigidly affixed to the backing-plate 2 in any desired manner. We prefer to provide small lugs or bosses 5 adjacent the shoulders as shown in Figure 4, so placed that when the face of the shoulder is nearly flush with the backing-plate surface, application of pressure will force the bosses into the drilled holes to flatten them and fill the space between the pin and hole walls to establish a rigid connection. In disposing the pins in the drilled plate, alternate rows of pins have the shoulders and bosses adjacent the surface on one side and the intermediate rows adjacent the surface on the opposite side of the same plate. This expedient results from observing that the wedging action of the aforementioned bosses somewhat distorts the backing-plate surface, which is in this alternating arrangement obviously compensated for.

Having described the nature of the "point" electrodes we use for producing a "brush" discharge and methods of fabricating a point-plate having discharge points lying substantially in the same plane, we will now describe several other important features of merit, such as point arrangement, distribution and proximity of points to plate, which factors are of considerable importance in the practical application of our invention. In the construction of the units comprising the numerous point-electrodes, the distance between the discharge points and the plate is of consequence. If the points are in too close proximity to the plate, electrostatic repression of the "brush" discharge occurs, and if more remote therefrom than necessary to give optimum results, a loss of effective operating space results. We have found a desirable location for the discharge points to be about ¾" from the plate, and indications are that the range ⅝" to 1¼" is the preferred limit in specific instances, altho we do not restrict our invention in all its aspects to such limitations.

For economy of construction, the number of discharge points per unit area is of importance. Electrostatic repression of the discharge increases as the proximity of the points approaches formation of a continuous surface. On the other hand, an increased number of points reduces the current loading per point and a diminished tendency toward formation of spark or power arcs results. It is, therefore, desirable to take a midcourse in the number of points given an electrode surface, i. e., the number should be sufficient to facilitate discharge, but insufficient to contribute significantly to a repression effect. We have found the optimum compromise is secured with a symmetrical spacing at about ¾" interval and believe the desirable limits to be in the range ⅝" to 1¼". We have also found that an interdependence between point spacing and their height from the plate is of consequence and if, for example, we use points about ¾ inch from the plate, we space them at about ⅞ inch interval from each other. We have found a practical and effective disposition pattern of the discharge points in the electrode plane is one hexagonal in shape. In this manner each point is equidistant from the adjacent surrounding points, and any three points are at the tips of an equilateral triangle. We have found a practical material from which to fabricate our electrodes is aluminum and for the electrode points, as shown in Figure 4, the alloy "Lo-Cro" has many advantages.

As illustrated in Figure 8 the points of the pointed electrodes are each three-fourths of an inch from their bases, one inch from the opposite flat electrode surface, and seven-eighths of an inch from each adjacent point. The pointed electrode plates as shown are about three-eighths of an inch thick, five feet, one inch long and five feet, six inches high and the active surface area for brush discharge covered by the points is approximately four feet by five feet, requiring approximately forty-three hundred pins for each gap.

Having now described a preferred construction of a point-electrode adapted to produce an electrical discharge of the "brush" type within an electrical circuit to destroy the gum-forming tendency of fuel gas in distribution, as described in the aforesaid co-pending application, by reference to certain of the drawings beforementioned we will describe various disposition of said electrodes in the illustrated apparatus in which they are incorporated and wherein such a "brush" discharge may be brought into contact with substances it is desired to process therewith such as coke oven gas to be distributed. In Figures 5 and 6 are shown a chamber or housing 13 embodying an operating exemplification of our invention wherein a fluid, as for example coke oven gas, as aforesaid is subjected to said discharge. It is unnecessary in an electrical circuit wherein it is desired to effect a "brush" discharge, that both electrodes comprising the discharge gap shall be points, since one point electrode is sufficient for the purpose. Therefore, in this apparatus for reasons of economy and better control of the polarity of the discharge, one side of a circuit gap only is so equipped, the opposite electrode being a flat surface.

Within the housing 13, are alternately disposed a plurality of point and grounded flat electrodes 7 and 12 respectively. The point and flat electrodes are assembled into groups insulated from each other, the point electrodes being affixed and supported at their lower ends to the insulated frame 8 which is isolated electrically from ground by the inferior supporting insulators 9. At their upper ends they are maintained in uniform spacing by the through-rods 10 and the spacers 11, while the flat or grounded electrodes 12 are attached to and suported by the body of the housing (Figure 7). Inlet and outlet openings 14, 15 respectively are provided for the inflow and outflow of the processing fluid as well as insulator compartment inspection holes 16. The electrodes are divided into two groups or nests by the division wall 17 which also divides the treating chamber into two separate compartments communicably connected with each other for serial flow of gas by the opening 19 in the division wall. The fluid entering the chamber 13 through inlet 14 flows downward, as indicated by the arrows and passes in parallel through the inter-electrode spaces or flue-ways 18 between the electrodes of one group, said spaces being filled with a "brush" discharge as above described, if the grounded and point electrodes are maintained at the required difference of electrical potential. From the bottom of the inflow compartment, the gases being processed pass through the opening 19 in the division wall and flow upwards in parallel streams between similar inter-electrode spaces of another group in the adjoining compartment.

The insulators 9 supporting the framework 8 above, and to which the lower ends of the point electrodes are attached, are housed in compartments 20 which are maintained at a higher temperature than the fluid passing through the housing 13. This elevated temperature is maintained by steam coils 21 or by any preferred means. Deposition of adventitious aqueous or other condensate on the insulators is thereby prevented, which might make them conducting surfaces. The insulator compartments 20 communicate with the electrode housing space above and adventitious drip from the electrodes is prevented from entering the insulator compartments by the drip-shields 22.

Glass covered inspection holes 60 are provided in the housing 13 to enable operators to observe operating conditions therein. Drain openings 61 are furnished to facilitate withdrawing such condensates as may collect from time to time or remove oil that has been used to flush adventitious materials that have settled on the electrodes. At the ends of the apparatus, man-holes 62 provide entrances to the treating compartments.

Isolation from ground, of a group of electrodes disposed functionally and structurally as a unit, by means of basal supporting insulators which may be housed in a heated compartment, comprises an important feature of our invention. By thus maintaining the insulators in an environment outside the flow-path of the processing fluid and above a temperature at which electrically conducting aggregations will gather on said electrodes, the establishment of short circuits across them is effectively avoided. This feature has also an economic aspect in that the necessity of drying the fluid before its entrance into the treating space is eliminated by such arrangement, as may be required in the cases where the insulators are disposed in the flow path of the processing fluid. An insulated bushing 24 is provided to lead the electrical potential through the housing 13 to the discharge electrodes. Through said bushing is passed the electrical conductor 26 which is affixed to one of the supporting columns 23 as shown.

As will be noted in the drawings, the space relationship of the grounded and discharge electrodes determines the length of the discharge gap; i. e., the distance from the tip of the sharp points of the discharge electrodes to the face of the grounded electrode. The length of the gap is of practical importance in our invention. A wider gap gives more treating space and reduces the effect of any lack of precise uniformity in the distance of the points from the electrode backing-plate which may give rise to arcing; a wider gap, however, has the disadvantage of higher electrical energy consumption than a narrower one, for the production of the "brush" discharge. We have found that a gap of about one inch represents the best compromise between the factors involved, and believe the desirable practical limits of the gap distance to be between $3/4''$ and $1\frac{1}{2}''$.

In the aforedescribed embodiment of our invention we have discussed an apparatus for subjecting fluids to an electrical discharge of the "brush" type wherein the point discharge electrodes are disposed in two nests or groups, each functionally acting as a unit; i. e., so that at any one instant, when an alternating current is applied to the electrical circuit, the group of electrodes in one compartment are all at positive polarity and those in the other at negative. Such arrangement possesses structural and operating advantages. A plurality of smaller electrodes in a group for gas flow in parallel, rather than a single large one, is more simply kept adequately flat, and by housing each so sub-divided electrode in its own compartment better mixing of the processing fluids is effected, such proportion of the fluid as in one compartment may escape the effect of the "brush" discharge by flowing down the edges of an electrode will be remixed and given opportunity in the following compartment to come in contact with said discharge.

Figures 15, 16 and 17 show the housing, assembly of electrodes and structural details of another embodiment of our invention, wherein the plane discharge electrodes 40 are those isolated from ground by means of supporting member 41 having insulators beneath, which reside in small basal compartments outside the main housing, and the point studded electrodes 39 of the aforementioned plate type are grounded.

The alignment and spacing of the discharge electrodes is secured by fastening their vertical edges to the housing structural member 42. The smooth electrodes are affixed at their lower ends to the supporting member 41. As a further aid in maintaining the proper mutual relationship of the plates to each other, we provide the through-rods 43 and the spacers 44. Holes 45' are provided in both the discharge and smooth electrodes to afford ample clearance for the alignment spacers 44 to prevent sparking or arcing across them, alternate horizontal rows of holes being in the smooth electrodes and the intermediate rows of holes in the discharge electrodes, substantially as shown in Figures 16 and 17.

Having described a preferred and alternative method of fabricating "point" electrode plates and means for embodying them in feasible apparatus which are practically serviceable for production of a "brush" discharge of sufficient amount and intensity to permit commercial quantities of fluids and more especially fuel gases of the types found in the trades, as aforesaid, to be subjected to its influence for the purpose and result described above, with the usual electric power available at such plants, we will now indicate various types of electrical circuits which we have conceived and found may be used to energize the electrodes, as well as some results these divers circuits effect.

We have found in our stabilization of manufactured gas, of the type produced in coking retort ovens, against the tendency to form gummy suspensoids of the nature produced by the presence of oxides of nitrogen therein, during its distribution in municipal gas distribution systems, notwithstanding the previous purification of the gas of its tar, ammonia, $H_2S$, HCN and naphthalene, that the stabilization is best effected by a positive discharge. Referring to Figure 10, where diagrammatic representation of a simple electrical circuit is shown, numeral 45 represents a step-up transformer for bringing the voltage up to the required potential, 46 is the point-bearing or discharge electrode, 47 the flat electrode and 48 the space through which the gas passes to be treated by the "brush" discharge that fills this space when the electrodes 46, 47 are held at the required electrical potential difference. When an alternating current is used as the source of energy supply to maintain the electrodes at the preferred electrical potential, they are alternately at positive and negative sign and as aforementioned, when the "point" electrode is at positive polarity the resulting "brush" discharge is about twice as effective in stabilizing the gas as when the point bearing electrode is at negative polarity. This seems to be an intrinsic characteristic of coking oven retort gas purified as aforesaid of all but the naphthalene and light oil.

Oscillographic records made of the electrical characteristics, i. e., the voltage and current relationships obtaining in the simple electric circuit as shown in Figure 10, when the electrode pair is immersed in coking oven retort gas, purified as aforesaid but still to be washed to remove naphthalene before being delivered to the distribution system, are given in Figure 11. This record of a voltage wave cycle, "Pri. E" is shown to be a symmetrical sine wave in form. The horizontal line is the zero axis. Positive potentials of the point electrode referred to the flat electrode are indicated above the zero line and negative potentials below. Below the zero voltage axis is the zero current axis which is thus set off merely for clarity and convenience. Threading above and below this axis is shown the current wave, designated as "I-treater", which indicates the current flux across the gap during one voltage wave cycle.

This oscillograph clearly indicates that even though the voltage wave throughout the cycle was symmetrical and maximum difference in potential between the electrodes was the same whether the points were positive or negative, the current flow was not as great when the points were positive as when of the opposite polarity. This fact is of special significance in view of our discovery that the positive discharge is twice as effective for the purpose of stabilizing coke oven gas against a tendency to form gummy suspensoids in the presence of nitrogen oxides.

With the type of simple discharge gap shown in Figure 10, therefore, a certain amount of current rectification in favor of the negative discharge is effected by coking retort gas as aforesaid which results in lessening the efficiency of the treating device and saturation of the transformer core. Fluctuations in the composition of the gas passing through the discharge gap give rise also to fluctuations in the degree of rectification, resulting in a lower energy and apparatus efficiency. The aforementioned oscillograph record shows conclusively that coking retort gas offers greater resistance to current flow when the discharge points are positive than when at negative polarity, with a consequent reduction in energy transfer during that half of the wave cycle. Attempts to increase the current flow and thereby increase the more effective discharge when the points are positive, by increasing the circuit voltage beyond a maximum that the negative discharge can tolerate, will give rise to destructive and wasteful power arcing during the negative portion of the cycle. Including inductance or resistance in series with the primary circuit of the transformer or in series with the electrodes on the high tension side in order to suppress the electric flux during the negative half of the cycle, incurs substantial waste of energy.

Inasmuch as the usual type of industrial current available is alternating in character, it is highly desirable to adapt our apparatus to an economical employment of the same, by minimizing or eliminating the aforedescribed effects attending its use in a circuit having a single electrode pair.

To meet these requirements we have invented a simple, effective and novel solution which forms an important part of our invention. By connecting the point electrodes in such manner as to place two electrical discharge gaps or gas treating spaces or multiple thereof in series within the electrical circuit, as is effected by electrically connecting one point-studded plate to each transformer terminal and disposing a grounded plate equidistant from each plate so that within the series gaps the current always flows from point to plate to point in the electrical circuit, we obtain many desirable results. This type of circuit system is shown in Figure 12, wherein the like numbered parts are as in Figure 10. An inductance means 49 is shown in series with the primary of the step-up transformer. When the pointed electrode 46A is positive, the electrode 46B is negative and vice versa, and the two gaps shown are respectively carrying a positive and negative discharge.

Since in this arrangement there is always a positive and negative discharge gap of the same dimensions in series, regardless of which electrode is positive or negative, the current flux across the series gaps will always be the same. Therefore, if a symmetrical voltage wave is applied to the series gaps, a symmetrical current wave will result and the positive discharge will be equal to the negative discharge at all times. This is clearly substantiated by an oscillogram taken of the current passed through such a series gap connection and reproduced in Figure 13.

Although the current passed through the series gap will give equal positive and negative discharge at all times, the potential drop in each gap of said series will not be the same and will be proportional to the resistance encountered. Thus, by a simple arrangement and without expense for additional equipment, we have provided means for obtaining an equivalent discharge through both gaps whether they are positive or negative and in spite of the inherent differences in resistance to current flow exhibited by them when immersed in coking oven retort gas.

Within the series gap circuit we employ a small value of inductance or resistance as 49 in Figure 12 which serves as a safety device to quench arcing in those rare instances in which arcs may simultaneously occur in both gaps; but as contrasted with the inductance or resistance requirements for limiting the current surge on negative point discharge in a single gap, as Figure 10 when immersed in coke oven gas where a 40 to 50% power loss is entailed, we find that only about 5% to 10% power is lost in the series gap connection, since only small inductance or resistance values are required. The inductance or resistance 49 may be placed either in the primary or secondary circuit of the transformer.

The gas treating capacity of discharge electrodes connected in a series gap circuit depends amongst other factors on the electrode surface area made available for that purpose in an installation. In our invention, the alternately positive and negative point electrodes and the grounded plate between may each be a single plate, or in those cases where high capacities are required and the size of the single electrode becomes such as to be unwieldy and to present structural difficulties because of their weight and tendency to distortion, each plate may be subdivided into the same number of sections, the sections of each single electrode being connected in parallel in the electrical circuit, and thereby function as a single electrode without departing from the spirit of our invention. This adaptation of our invention is shown in Figures 5, 6, 7 and 8.

It is obvious that any even number of electrode pairs may be placed in the series gap circuit without destroying the electrical symmetry, provided that all of the pairs are similar and that the half of them are connected in reverse order in respect of the other half, and we, therefore, do not intend to limit our invention to two gaps in series. As the number of gaps is increased, however, the over-all voltage must be increased proportionally and the higher voltages render the construction of the transformers, insulators, etc, more difficult and expensive and the use of more than two gaps is less convenient from the standpoint of construction and particularly so in the case of isolation of insulated sets of electrodes.

It is immaterial with alternating current whether point or plate electrodes are connected to the source of power provided the symmetry is maintained, and the power carrying electrodes are insulated from ground.

Connecting the electrode pairs in the series gap manner removes the disadvantages that arise when employing an alternating current in an electrical circuit having only one discharge gap, in that sparking and sustained arcing tendencies are substantially avoided. As previously stated, the current discharge capacity of a given electrode, disregarding the voltages required, is greater for the negative than for the positive discharge. It is, therefore, evident that the amount of the current passing through the electrodes in series gap connection will be limited by the positive discharge capacity, which has less tendency to arc than the negative; and the positive gap, therefore, with its greater resistance in the series will consequently maintain the current flow below the maximum that can be tolerated by the negative discharge gap. Furthermore, with the series arrangement of circuit gaps it is unlikely that a condition of low resistance will occur simultaneously in both; but in the event of a momentary resistance drop in one gap due, for example to over-ionization, the resulting increase in current, which will tend to form an incipient arc, must pass through the adjacent associated gap in the series circuit in the form of a brush discharge. The gas in the associated gap is, however, of high ohmic resistance and the increased current will so reduce the voltage at the point an arc is tending to form as to quench it. In a series gap, therefore, there is an added resistance, in the circuit for damping arc formation, that does not exist in the single gap.

In the aforegiven description of the series connection of the discharge electrode pairs, reference has been made only to its use in an apparatus for treating coking retort oven gas, the special characteristics of which it was especially invented to satisfy, namely, a higher potential is required to produce a positive "brush" discharge in said gas than a negative one, which fact, when a single electrode pair was used in an electrical circuit employing an alternating current to maintain the electrodes at proper potential to produce a discharge of the "brush" type, was responsible for less efficient energy utilization, gave rise to the possibility, under some circumstances of variation in the composition of the gas, of power arcing, which might even be destructive of materials used for electrode fabrication to such extent as to lessen considerably the economic aspects of our process and apparatus.

Although in the just foregoing we have described a method of energizing the discharge electrodes of our invention by means of an alternating current applied in a unique and novel manner thereto, we do not limit our invention in its entirety to use of current of that nature.

As aforementioned, coking oven retort gas is electrically most efficiently stabilized against tendencies to form gummy compounds of the type produced during distribution by the presence of nitrogen oxides, by means of the positive discharge component of the current wave; it being about twice as effective as the negative component. For reasons of economy, therefore, the use of a rectified current and more especially the type of current resulting from double half-wave rectification is often desirable where the cost of electrical energy is not particularly low. By double half-wave rectification, we mean directing each half wave of an alternating current at the same polarity and at substantially half the potential of the transformer alternately to the discharge electrodes or group of electrodes which are still connected to the transformer terminals as in the case of the series gap, in the aforementioned secondary circuit. In this manner all of the electrical energy expended in the gas may be applied as the positive brush discharge, with resultant operating economy. This will be more clearly understood by reference to Figures 14 and 18.

In Figure 14, 49 is a stabilizing inductance of low value, 45 is a step-up transformer provided with a grounded mid-tap on the high potential side, 51 are filament transformers energizing the filaments of the rectifying tubes 50, and 46, 47 are respectively the discharge and grounded electrodes in the circuit gap.

The rectifying tubes 50 are so connected that only positive polarity is applied to the electrode discharge points, and the two electrodes 46 are, therefore, alternately charged at positive polarity and the "brush" discharge takes place therefrom, only on alternate half cycles; and since the electrode pairs in which the electrodes 46 function are identical in all respects the discharges are equal on successive half-waves. This gives a circuit of high efficiency because only the more effective, for this specific purpose, positive discharge is used. The tendency to spark and form arcs is greatly diminished since the current is interrupted during each wave cycle of current alternation, which interruption quenches incipient arcs. This employment of a rectifying device in each leg of the transformer having a grounded mid-tap is preferable to the use of a single tube because of the symmetrical wave form of the primary current secured in the former arrangement, which avoids core saturation of the transformer.

A power economy also results from using rectified half-wave current to energize the discharge electrode, the expense for the power item being reduced on the average forty per cent below that when energizing with full wave operation, since it has been demonstrated that the positive discharge applied intermittently to the apparatus illustrated in Figures 3-9, 14 and 18 is substantially as effective as a constant or full wave positive discharge in stabilizing coking retort oven gas against a tendency to form gums. This discovery that the chemical reactivity induced in coking retort gas by the brush discharge continues undiminished through a period of interruption of such discharge equal to a half cycle or more, is of great significance in the economics of our process.

Although we have described effecting the rectification by means of rectifying tubes, it is understood that any rectifying unit which will pass a half-wave, as for example, a mechanical rectifier can be used for that purpose.

In Figure 18 is shown a schematic wiring diagram of an electrical circuit system that is here used to modify the characteristics of alternating electrical currents normally found in industrial installations, so that such sources of electrical energy may be used to energize the discharge electrodes of our invention.

In the particular instance shown in this diagram, the current used for our purpose is of the 440 volt, single phase and 60 cycle alternating type. The lead lines A and B communicate with this source of electrical energy as indicated in the upper left hand corner of the diagram. The discharge electrodes in the treating apparatus Nos. 1, 2 and 3 may be placed in direct electrical communication with the lead wires A, B, by means of the power transformer and the current supply lines 123 and 125 by placing the disconnecting switches in positions indicated by II in the diagram, in which instance the discharge electrodes will be energized by an alternating current flowing from said power transformer, for example, through line 123 and distributed through lines 128, 129, 130 to the "brush" discharge gap in the treating apparatus 1, 2, 3 respectively and thence returned to the opposite terminal of the transformer through lines 126, 131, 132 and line 125; or, in the event it is preferred to energize the discharge electrodes within the treaters 1, 2, 3 by a current rectified according to the double half-wave principle of our invention, the indicated disconnecting switches may be closed in positions indicated by I, in which case, the alternating current flowing from the power transformer will pass alternately by means of lines 123, 125 through the switches I into the lines 118, 116 respectively and through the rectifier tubes for rectification, and thence to the respective discharge electrode groups within the treaters by lines 117, 115 to return in both instances by means of "G" and grounded line 124 to the mid-tap of the transformer.

Various protective features are indicated in the diagrammatic circuits just described which serve to protect the equipment and workmen against such eventualities as short circuiting, current under and over loading, failure of rectifying tubes, etc.; also indicated are auxiliary devices for eliminating the effect of fluctuations in the source of energy supply, for maintaining the switches in preferred positions and for indicating existing current characteristics, but since these features serve in general only to protect equipment and assist maintaining uniform conditions within the described circuits and consequently bear only indirectly on the principles of the invention, they will not be discussed in this specification in detail, but are disclosed in the drawings.

By means of the above described circuits, it is possible to optionally energize the discharge electrodes within the treaters 1, 2, 3 with either an alternating current or a rectified half-wave current by the simple expedient of respectively closing the switches across the circuit gaps II or I indicated in the diagram. This feature makes possible a rapid change from one type of operation to the other and offers a special advantage in that whenever a rectifier tube fails, operation may be quickly changed and the discharge electrodes energized with an alternating current whereby treatment according to our process may be resumed with little loss of time.

The voltages that we employ in our process are broadly speaking those required to produce the maximum flow of current across the treating space in the form of a "brush" discharge. This voltage will depend upon the type of gas to be treated, the construction of the discharge electrodes, the kind of stabilizing circuit employed, the kind of current and the length of the discharge gap. In general, the value of the potentials involved have been found by us to be, in the case of an alternating current discharging through coking retort oven gas from electrodes having a single one inch discharge gap, to range between 10,000 and 13,000 (RMS) volts.

The gas after it leaves the oven battery flows in sequence through the following steps: (1) primary-coolers, (2) tar precipitators, (3) exhausters, (4) reheaters, (5) ammonia saturators, (6) liquid purification of $H_2S$, HCN, (7) oxide purification boxes for last traces of $H_2S$, (8) final cooler, (9) electrical gum treater of the present invention, (10) naphthalene scrubber which also washes out the NO converted to $NO_2$ in step (9) either alone or as gums formed by their accelerated reactivity due to the chemical reaction of the brush discharge of step (9) on the nitrogen oxides, (11) surplus gas holder, (12) send out (distribution) system.

While our apparatus is designed primarily to operate at the usual gas pressure prevailing in a gas manufacturing plant, it may be easily modified to operate at higher or lower pressures by suitable changes in construction and operating voltages. For example, for high pressures, we would enclose the electrode nests in a suitably strong housing, preferably cylindrical in nature, the better to withstand the pressures involved, and would increase the operating voltage to a point where the high resistance of the compressed gas was overcome and the proper "brush" discharge secured.

Empirical tests with the above apparatus have shown that properly subjecting coking oven retort gas at the above indicated stage of the purification during the manufacturing period to an electrical discharge of the type known as the "brush" discharge, will preclude 90 to 95% of its tendency to form gummy suspensoids and deposits in the lines and appliances through which it is later distributed to the consumer.

For maintaining optimum operating conditions in the apparatus of our invention, it is of consequence that a uniform distance between all the points on a point-studded electrode and the opposing plate electrode forming a discharge gap, be constantly maintained. The deposition or accumulation thereon of small amounts of materials which may be either normally or abnormally entrained in the processed gases must be avoided since aggregations of such materials may tend to decrease the distance between the points and the opposing electrodes and thereby establish conditions for promoting undesirable sparking and arcing across the discharge gap.

For obviating the accumulation of such adventitious materials, we have found that flushing the electrodes with a thin film of oil is an effective expedient, not only to reduce the tendency of such materials to adhere to the electrodes but also to provide for their removal after settling. Any appropriate oil may be used for the purpose and may be distributed over the electrode surface by divers means, as for example, from a distributing header extending along the upper margin of each electrode, said header containing orifices through which a thin film of oil may be discharged onto the electrode surface beneath. In the instant embodiment of our invention, we use a simple and effective mechanical device for effecting this objective. We have found that by atomizing the flushing oil into the gas stream and allowing the gas stream itself to act as the distributing medium, said oil is effectively distributed to and settles over the points and plates of the electrodes and so provides an oily film between the electrodes and materials deposited thereon and for a flushing action that effects their removal. Flushing of the electrodes may be carried on intermittently or continuously as convenience or specific instances may require since this operation is not an essential feature of our invention but simply a maintenance convenience.

Figure 19 shows an oil atomizing nozzle made by Monarch Manufacturing Works, Inc., which is suitable for our purpose and Figures 5, 6 and 7 show the disposition thereof in our apparatus. In the latter figures, reference numerals 65 indicate the oil atomizing nozzles which are affixed to the oil delivery pipes 66, one such nozzle being located in the gas stream ahead of each electrode nest the processing gas traverses during its transit through the apparatus of our invention. Any suitable oil, as for example spent naphthalene scrubber oil which is produced by scrubbing manufactured fuel gases for naphthalene removal with a petroleum derived absorbent or straw oil of about 36° Bé. specific gravity, and which when discarded for naphthalene removal purposes contains about 8 to 12% of naphthalene and from 25 to 35% of liquid aromatic derivatives, of which derivatives about one-half is heavy solvent naphtha and the remaining one-half a mixture of benzene, toluene and xylene, is sprayed through the atomizing nozzles 65 into the gas stream, said spent oil being flowed through the pipes 66 provided for this purpose. The flushing oil dispersed through the gas stream in this manner, is thereby distributed over the electrodes as the gas flows through the treating flues 18. As this oil settles on the electrodes and drains therefrom, it collects in the bottom of the housing 13 and returns through pipes 61 to the spent naphthalene scrubber oil storage means.

In the foregoing specification, the term "brush" or "point" has been used to characterize the type of electrical discharge we prefer for effecting the results obtained in the apparatus of our invention. In technical literature and parlance relating to electrical discharges, however, both in the present and past, confusion is found to exist which results from loose usage of the nomenclature that has been evolved in attempting to identify and characterize the numerous discharge phenomena obtained by flowing an electric current across a discharge gap. Many of the terms used for this purpose, are based on some physical characteristic or aspect of the discharge, which may describe some property thereof, but do not definitely define or particularize them. To one, for example, a "silent" discharge may indicate any type of electrical discharge unaccompanied by the relatively loud crackling sound or sparks and sustained arcs, including therein even such discharge as are "luminous" and "non-luminous," in spite of the fact that they are not strictly soundless, but only relatively so; to another, a "corona" discharge may be an inclusive name including all discharges that emit a glow, in spite of the fact the discharges producing a glow assume a variety of forms and result from rather definite current characteristics and conditions that are required to produce them.

It becomes, therefore, obvious that an exposition of the sense in which we have used the terms "brush" or "point" discharge and a definition of the current characteristics and discharge effects we prefer to produce our desired results, will serve to more closely characterize and particularize our present invention and its objectives.

When two electrodes, attached to opposite terminals of a transformer and spaced so that a gap intervenes, are immersed in a gas at about atmospheric pressures, and maintained at different electrical potentials, one electrode will discharge to the other depending on their relative polarities and shapes and a current will flow across the gap.

When the potential difference between the electrodes is comparatively low, the current leak through the gap is small and will be carried primarily by free ions native to the gas. Such a discharge may be so small in amount as to be silent, invisible and will produce no chemical effects and the current is substantially proportional to the voltage gradient. If the potential difference between the electrodes is then somewhat increased, an increased gaseous ionization will be induced, resulting from some disintegration of atoms by electrostatic stress adjacent the electrode of smallest radius of curvature, and the current flow thereby improved to such extent, that a luminous discharge or glow will be seen; but even under these conditions the discharge will be one involving little energy transfer. Further increase of the potential difference between the electrodes, while attempting to increase the energy flow across the gap results in higher ion velocities and greater ionization by collision of the rapidly moving ions with molecules of the intervening gas. This increase in ionization by collision, in addition to increased primary ionization at this higher potential difference, permits a rapid rise in current. At this point, the conductivity of the gas will become so improved by the increased ionization that a localized rush of current in the form of a spark will flow between the electrodes if they are formed of flat surfaces. However, if the electrodes are properly shaped, this sudden rush of current can be controlled to be equally distributed over a far greater space volume than the spark represents, and the quantity of energy involved applied over a large field. When so regulated and directed, the large current flow takes the form of an extensive visible discharge which effectively fills the gap space and can be brought into contact with large volumes of material flowing therethrough. This controlled and distributed discharge of high energy flow has been called by us a "brush" discharge and inasmuch as the most effective distribution is produced by the use of points, it may be called a "point" discharge.

As previously indicated, our process for the stabilization of fluid fuels, and more especially, fuel gases and vapors, requires subjecting them intimately to the influence of a substantial quantity of electrical energy. Economy of operation demands that this be economically and rapidly effected. In our instant invention, therefore, we provide a unique and novel apparatus designed to reduce the current repressing effects of continuous surfaces and facilitate transfer of electrical energy across a discharge gap and to so uniformly distribute it throughout the gap space that the formation of sparks is substantially avoided. In respect of this, our objective is in contract with that of the electrical precipitation devices. Whereas, in the latter, the objective is to establish an electrical field of high potential gradient while maintaining the current leak thereacross at a very small value, our objective is to provide for the pouring of electrical energy through the field as rapidly as possible and yet avoid the, for our purpose, wasteful and material destructive sparking and arcing phenomena. By means of the point-studded electrodes of our present invention, we furnish a device such that an effective dispersion and substantially uniform distribution of a large electrical current at intermediate voltages across a discharge gap, is obtained.

Filaments and edges having small irregularities protruding above their otherwise substantially smooth or plane continuity give a certain amount of discharge of the "brush" type but the quantity is minor and the surface repression effects of the practically continuous smooth or plane uniformity of the filament or edge tends to restrict or suppress a facile discharge of electrical energy. By means of the points uniformly distributed over the surface of the electrodes of our invention, we endeavor to eliminate these repression and resistance effects which hamper free current flow and thereby provide an improved means for establishing a current discharge of sufficient magnitude to incite the chemical reactivity of the fluid fuels, which our process requires.

The invention as hereinabove set forth is embodied in particular form and manner but may be variously embodied within the scope of the claims hereinafter made.

We claim:

1. An apparatus adapted to effect stabilization of fuel gases or vapors against formation of gums of the type caused by the presence therein of oxides of nitrogen, comprising: a treating chamber provided with inlet and outlet means; an electrical circuit system comprising a primary circuit, a transformer, a secondary circuit capable of carrying a current at high potential and containing at least one discharge gap within the treating chamber, formed by a point studded discharge electrode and an opposing complementary electrode, the points of the discharge electrode being disposed equidistantly from those adjacent and from the opposing electrode with the points about three-fourths of an inch from their bases, one inch from the opposing electrodes, and seven-eighths of an inch from each other, and electrically isolated from the treating chamber and ground by means of interior supporting insulators, so as to induce in a flow of gas in such gap a brush discharge of sufficient leak to accelerate chemical reaction of sluggishly reacting constituents, like nitrogen oxides in coke oven gas, without substantial precipitation of reaction products in the gap or arcing.

2. An apparatus for removing oxides of nitrogen from fuel gases or vapors by means of an electrical discharge predominantly of the brush type, comprising: an even number of serially communicably connecting treating compartments provided with inlet and outlet means; an electrical circuit system comprising, a primary circuit, a transformer, and a secondary circuit adapted to carry voltages of high potential and having therein electrical discharge gaps within each treating compartment formed by vertically disposed flat electrodes having substantially plane surfaces on each side and supporting sharp points disposed in hexagonal pattern on each side thereof in such manner that each point is equidistant from the supporting electrode and an opposing grounded electrode; parallel fluid flow treating gaps formed in each compartment by grounded plates intermediate the electrical discharge gaps; a supporting member for the discharge electrodes, the discharge electrode of each half of the even number of treating compartments being isolated electrically by interior supporting insulation means from ground and from the other half, and the discharge electrodes of the respective halves of the even number of compartments being connected in series gap circuit by the grounded opposing electrodes, and the discharge electrodes of the respective halves of the even number of treating chambers being connected with the opposite terminals of the transformer so as to be oppositely charged in alternation, to induce in a flow of gas in such gaps a brush discharge of sufficient leak to accelerate chemical reaction of sluggishly reacting constituents, like nitrogen oxides in coke oven gas, without substantial precipitation of reaction products in the gaps or arcing.

3. In an apparatus for removing oxides of nitrogen from fuel gases or vapors by means of an electrical discharge of the brush type, comprising: an even number of serially communicably connecting treating compartments provided with inlet and outlet means; an electrical system comprising, a primary alternating circuit, a transformer, and a secondary circuit adapted to carry voltages of high potential and having a plurality of electrical discharge gaps within each treating compartment formed by vertically disposed flat electrodes having substantially plane surfaces supporting sharp points disposed in hexagonal pattern on each side thereof, so that each point is equidistant from the supporting electrode and the point-plane of the adjacent electrode, and parallel fluid flow treating spaces formed in each compartment by grounded plates between the discharge electrodes, the discharge electrodes of each half of the even number of compartments electrically communicating with a common header isolated electrically by interior supporting insulators from ground and from the other half, and the discharge electrodes of the respective halves being in series gap circuit through the grounded opposing electrodes, and electrical connections between the headers of the discharge electrodes of the separate halves of the even number of compartments and the opposite terminals of the transformer so as to oppositely charge the discharge electrodes in each half of the compartments in alternation, to induce in a flow of gas in such gaps a brush discharge of sufficient leak to accelerate chemical reaction of sluggishly reacting constituents, like nitrogen oxides in coke oven gas, without substantial precipitation of reaction products in the gaps or arcing.

4. An electrical apparatus for stabilizing fluid fuels of the nature of coking retort oven gas and containing oxides of nitrogen, against gum formation, comprising: a housing chamber provided with inlet and outlet, insulators in said chamber supporting interiorly a plurality of discharge electrodes which support a multiplicity of sharp points, all substantially equidistant from an opposing complementary electrode and with a symmetrical spacing of the points at intervals from each other within a range of five-eighths to one and one-quarter inches and from their bases at intervals within a range of about five-eighths to one and one-quarter inches.

5. An electrical apparatus for stabilizing fluid fuels of the nature of coking retort oven gas and containing oxides of nitrogen, against gum formation, comprising: a housing chamber provided with inlet and outlet means and containing a plurality of rigid vertically arranged point-studded grounded plates and a plurality of flat complementary electrodes substantially equidistant from the points of said grounded plates and alternately disposed therewith, the flat complementary electrodes being supported from beneath by a member supported on underlying insulating means and electrical circuit connections operatively disposing the flat electrodes into two outer alternately charged discharge conductors with studded electrodes grounded intermediate the same, and the ground intermediate electrode connecting the two outer discharge electrodes and the gas treating spaces therebetween in series within the electrical circuit.

6. In the art of producing a brush discharge in fluid fuels of the nature of coke oven gas to stabilize against gum formation, means for producing an extensive and uniformly chemically reactive electrical field within the flow path of a fluid fuel, said means including an electrical circuit comprising, an electrode assembly of at least one vertically disposed grounded electrode mounted between at least two discharge electrodes, the discharge electrodes being connected to an electric current source so as to be oppositely charged, and the grounded electrode being disposed between the oppositely charged electrodes so that the discharge electrodes are in series gap circuit with each other, one of said kinds of electrodes being constituted of a rigid perforated plate studded with points, the perforations rigidly supporting pins having sharp points which are equidistant from the adjacent surface of the perforated plate.

7. In the art of producing a brush discharge in fluid fuels of the nature of coke oven gas to stabilize against gum formation, means for producing an extensive and uniformly chemically reactive electrical field within the flow-path of a fluid fuel, said means including an electrical circuit comprising vertically disposed grounded electrodes and paired discharge electrodes, the discharge electrodes being connected to an electric current source so as to be oppositely charged, and the grounded electrodes being disposed between the oppositely charged electrodes in series gap circuit therewith, the discharge electrodes being studded with points and comprising, a plurality of similar metal sheets, rigidly supported by rods and spacers in predetermined relationship to the adjacent electrodes.

8. In an apparatus for stabilizing fluid fuels of the nature of coking retort oven gas against gum formation in the distribution lines therefor and comprising; a treating chamber with inlet and outlet; an electrical circuit system comprising, a primary circuit, a transformer and a secondary circuit adapted to carry current at high potentials and within said secondary circuit a plurality of electrodes adapted to effect an electrical discharge primarily of the brush type and connected in series gap circuit by grounded plates alternately disposed in respect of the discharge electrodes and substantially co-extensive in area, means for connecting the discharge electrodes to an alternating electric circuit source so as to provide oppositely charged discharge electrodes, means for grounding the ground electrode plates so that the discharge electrodes thereof are connected in series gap circuit with each other by their interposed ground electrodes.

9. In an electrical circuit system for effecting a brush discharge in fluid fuels of the nature of coking retort oven gas to stabilize them against gum formation and comprising; a primary circuit, a transformer, and a secondary circuit system capable of carrying high tension alternating current and containing electrodes adapted to produce a discharge predominantly of the brush type alternately disposed in respect of substantially co-extensive plate electrodes, the discharge and plate electrodes being spaced to form fluid fuel treating gaps and arranged in similar and equal electrical groups, the electrodes of an even number of fluid treating gaps being connected in series electrically in the secondary circuit system so that when an alternating current is applied to said circuit system, one-half the treating gaps is charged positively and the other half is concurrently charged negatively and vice versa, and the plate electrodes being grounded and being so associated with the discharge electrodes that the two halves of the circuit system are connected in series gap circuit by the interposed ground plates.

10. In an apparatus for stabilizing fluid fuels of the nature of coking retort oven gas against gum formation, by means of an electrical discharge predominantly of the brush type, and comprising: a gas treating chamber with inlet and outlet and containing an even number of electrically equal, similar and equivalent point and plate electrode assemblies, having the point and plate electrodes alternately disposed so as to be connected in series gap circuit and the point electrodes of one-half the assemblies insulated from the other half while the plate electrodes are grounded, a system for energizing the point electrode assemblies comprising, a primary electrical circuit, a transformer adapted to supply high tension alternating current and having the mid-point of the high voltage winding connected to ground, electrical connections from the high tension terminals of the transformer, the connection from one terminal being connected to one-half the discharge electrode assemblies and the connection from the other terminal being connected to the remaining half of the discharge electrode assemblies, each of said connections including energy directing devices adapted to pass current to the communicating discharge electrodes only on the half cycle during which the points are charged positively.

11. An electrical system for energizing electrodes adapted to effect a discharge primarily of the brush type in fuel gases or vapors to stabilize them against gum formation, comprising: a primary circuit system; a transformer having a grounded mid-tap on the high tension winding and adapted to supply high tension alternating current; a secondary circuit system containing discharge electrodes alternately disposed in respect of grounded complementary electrodes so as to be connected in series gap circuit, the discharge electrodes being arranged in equal and similar assemblies; electrical connections from the high tension terminals of the transformer, the connection from one terminal being connected to one-half the discharge electrode assemblies and the connection from the other terminal being connected to the remaining half of the discharge electrode assemblies, said connections including energy directing devices adapted to pass only each half wave of the same polarity of an alternating current and at approximately half the terminal voltage of the transformer successively to the electrodes communicating with said terminals, thereby avoiding core saturation of the transformer.

12. In an apparatus for subjecting a fluid fuel to an electrical discharge predominantly of the brush type to stabilize such fuel against gum formation and comprising: a treating chamber with inlet and outlet and having discharge electrodes therein arranged as two electrically equal and similar assemblies; and an electrical system comprising means for applying only the successive half waves of the same polarity of an alternating current, said means being connected to the discharge electrode assemblies so as to feed them in alternation, fluid fuel treating flues formed between the discharge electrodes and substantially co-extensive stationary complementary grounded electrodes intermediate the discharge electrodes, said treating flues being about half the width of the discharge electrode inter-space.

13. Apparatus for effecting stabilization of coke oven gas against formation of gums of the type caused by the presence of oxides of nitrogen in distribution systems for said gas, comprising: a gas treatment chamber having a gas inlet and gas outlet, a plurality of side-by-side discharge gaps for gas flow in parallel through the gaps between the gas inlet and gas outlet for the chamber, said gaps each comprising spaced electrodes at least one of which is studded with electrode studs the free ends of which are disposed equally distant from the free ends of adjacent studs on the same electrode and all equally distant from the opposing electrode forming the discharge gap therebetween the studded electrodes comprising a rigid flat metal plate having surfaces which are substantially planes and a light metal sheet fast thereon and provided with triangular tongues cut at two sides and bent along the third side outwardly from the plate with the points of the bent triangles symmetrically spaced from each other at intervals within a range of five-eighths to one and one-quarter inches and spaced from their bases at intervals within a range of about five-eighths to one and one-quarter inches.

14. Apparatus for effecting stabilization of coke oven gas against formation of gums of the type caused by the presence of oxides of nitrogen in distribution systems for said gas, comprising: a gas treatment chamber having a gas inlet and gas outlet, a plurality of side-by-side brush discharge gaps laterally of each other between the gas inlet and gas outlet for simultaneous gas flow through the gaps in parallel, said gaps each comprising spaced brush discharge studded electrodes for inducing in a flow of gas in each gap a brush discharge of sufficient leak to accelerate chemical reaction of sluggishly reacting constituents like oxides of nitrogen in coke oven gas without substantial electrical precipitation of constituents of the gas in the gaps or arcing, the studded electrodes each comprising a rigid flat metal plate with horizontal rows of stud apertures extending through the same, and the studs each comprising pointed pins having shoulders thereon at spaced distances from both ends thereof providing a boss beyond the same for wedged insertion in the stud apertures, the pointed pins being inserted in the apertures with the pins projecting from both sides of the plate, the shoulders of the pins of alternate rows of apertures engaging on one side of the plate and the shoulders of the pins of the intermediate rows of apertures engaging the opposite sides of the plate, and the pointed pins being disposed in their apertures with the points symmetrically spaced from each other at intervals within a range of five-eighths to one and one-quarter inches and with the points spaced from their bases at intervals within a range of about five-eighths to one and one quarter inches.

15. Apparatus for effecting stabilization of coke oven gas against formation of gums of the type caused by the presence of oxides of nitrogen in distribution systems for said gas, comprising: a gas treatment chamber having a gas inlet and gas outlet, a plurality of side-by-side brush discharge gaps laterally of each other between the gas inlet and gas outlet for simultaneous gas flow through the gaps in parallel, said gaps each comprising spaced brush discharge studded electrodes for inducing in a flow of gas in each gap a brush discharge of sufficient leak to accelerate chemical reaction of sluggishly reacting constituents like oxides of nitrogen in coke oven gas without substantial electrical precipitation of constituents of the gas in the gaps or arcing the studded electrodes each comprising a rigid flat metal plate with horizontal rows of stud apertures extending through the same and studs comprising sharp double end pins with shoulders thereon extended through the apertures until the shoulders engage the rigid plate providing sharp points on opposite sides of the plate apertures, the shoulders of the pins of alternate rows engaging one side of the rigid plate, and the shoulders of the pins of intermediate rows engaging the opposite side of the plate, and the points of the pins on the respective sides of the plate being symmetrically spaced from each other at intervals within a range of five-eighths to one and one-quarter inches with the points spaced from their base at the surface of the rigid plates within a range of about five-eighths to one and one-quarter inches, said brush discharge gaps being disposed in a plurality of separately electrically energizable groups communicating for gas flow in series from one to the other thereof.

16. Apparatus for effecting stabilization of coke oven gas against formation of gums of the type caused by the presence of oxides of nitrogen in distribution systems for said gas, comprising: a gas treatment chamber having a gas inlet and gas outlet, a plurality of side-by-side brush discharge gaps laterally of each other between the gas inlet and gas outlet for simultaneous gas flow through the gaps in parallel, said gaps each comprising spaced brush discharge studded electrodes and interposed grounded stationary electrodes for inducing in a flow of gas in each gap a brush discharge, the side-by-side discharge gaps being connected in series gap circuit by the interposed grounded electrodes and said brush discharge gaps being disposed in a plurality of separately electrically energizable groups communicating for gas flow in series from one to the other thereof, and a system for energizing the discharge electrodes of said groups with alternating current, said system being connected with the discharge electrodes so that when one group is positively charged another is concurrently negatively charged and reversely.

17. Apparatus for effecting stabilization of coke oven gas against formation of gums of the type caused by the presence of oxides of nitrogen in distribution systems for said gas, comprising: a gas treatment chamber having a gas inlet and gas outlet, a plurality of side-by-side brush discharge gaps laterally of each other between the gas inlet and gas outlet for simultaneous gas flow through the gaps in parallel, said gaps each comprising spaced brush discharge studded electrodes with interposed stationary grounded electrodes in series gap circuit for inducing in a flow of gas in each gap a brush discharge, said brush discharge gaps being disposed in a plurality of separately electrically energizable groups communicating for gas flow in series from one to the other thereof, and a system for energizing the discharge electrodes of said groups comprising a primary circuit, transformer having a grounded mid-tap on the high potential side and leads connecting the discharge electrodes of a portion of the groups with one terminal and the remaining portion of the groups with the other terminal of the transformer, said system including rectifying means connected to apply only positive polarity to the discharge electrodes, said rectifying means comprising rectifying device in each leg of the transformer.

18. Apparatus for effecting stabilization of coke oven gas against formation of gums of the type caused by the presence of oxides of nitrogen in distribution systems for said gas, comprising: a gas treatment chamber having a gas inlet and gas outlet, a plurality of side-by-side brush discharge gaps laterally of each other between the gas inlet and gas outlet for simultaneous gas flow through the gaps in parallel, said gaps each comprising spaced brush discharge studded electrodes with interposed stationary grounded electrodes in series gap circuit for inducing in a flow of gas in each gap a brush discharge, said brush discharge gaps being disposed in a plurality of separately electrically energizable groups communicating for gas flow in series from one to the other thereof, and a system for energizing the discharge electrode of said groups comprising a primary circuit, transformer, and leads connecting the discharge electrodes of a portion of the groups with one terminal and the remaining portion of the groups with the other terminal of the transformer, each of said leads including energy directing devices adapted to pass only each positive half wave of an alternating current and at approximately half the full potential of the transformer successively to the electrodes connected to the respective leads.

19. In an apparatus adapted to produce an electrical discharge of the brush type for stabilization of fuel gases and vapors against formation of gums of the type produced by the presence of oxides of nitrogen in distribution lines for said gas, and comprising; a treating chamber provided with inlet and outlet means and an electrical circuit system comprising a primary circuit, a transformer, a secondary circuit capable of carrying a current at high voltages and containing a plurality of discharge gaps for gas flow in parallel through the gaps within the chamber formed by vertically disposed multiple point-studded alternately charged discharge electrodes and interposed stationary complementary grounded electrodes in series gap circuit, means for applying a film of liquid to the electrode surfaces, said means being suitably located in the gas flow-path adjacent the electrodes but out of circuit therewith, whereby materials settling on the electrodes from gases flowing through the discharge gaps will be removed by liquid draining from the electrodes.

20. In an apparatus for stabilizing fluid fuels of the nature of coking retort oven gas against gum formation, by means of an electrical discharge predominantly of the brush type, and comprising: a gas treating chamber with inlet and outlet and containing an even number of electrically equal, similar and equivalent alternately charged point and stationary grounded plate electrode assemblies, having the point and plate electrodes alternately disposed and in series gap circuit, a system for energizing the electrode assemblies comprising, a primary electrical circuit, a transformer adapted to supply high tension alternating current and having the mid-point of the high voltage winding connected to ground, electrical connections from the high tension terminals of the transformer, the connection from one terminal being connected to one-half the electrode assemblies and the connections from the other terminal being connected to the remaining half of the electrode assemblies, each of said connections including energy directing devices so disposed in respect of the point electrodes in the communicating half of the assemblies that the point electrodes are always at positive potential in respect of the plate electrodes when energized.

WALTER L. SHIVELY.
EARL V. HARLOW.